(12) United States Patent
Modzik et al.

(10) Patent No.: US 7,051,498 B2
(45) Date of Patent: May 30, 2006

(54) TRACTION ENHANCEMENT SYSTEM FOR TURF MOWERS

(75) Inventors: Andrew Modzik, Charlotte, NC (US); Robert Dobbs, Matthews, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/851,990

(22) Filed: May 21, 2004

(65) Prior Publication Data

US 2005/0257508 A1    Nov. 24, 2005

(51) Int. Cl.
*A01D 75/28* (2006.01)
(52) U.S. Cl. ............... 56/10.2 R; 56/10.3; 56/DIG. 15
(58) Field of Classification Search ............. 56/10.2 R, 56/10.3, DIG. 15; 37/348, 382, 414, 415, 37/416; 172/2, 3, 7
See application file for complete search history.

(56) References Cited

U.S. PATENT DOCUMENTS

| 3,834,481 | A | * | 9/1974 | Carlson ...................... 180/197 |
| 4,848,481 | A | * | 7/1989 | Bidon et al. .................... 172/7 |
| 4,864,805 | A |   | 9/1989 | Hager et al. |
| 4,920,732 | A | * | 5/1990 | Lee et al. ................. 56/10.2 R |
| 5,190,111 | A | * | 3/1993 | Young et al. ................... 172/7 |
| 5,471,825 | A | * | 12/1995 | Panoushek et al. ...... 56/10.2 E |
| 5,784,867 | A | * | 7/1998 | McFarland et al. ...... 56/10.2 R |
| 5,911,769 | A | * | 6/1999 | Orbach et al. ................. 701/50 |
| 6,119,786 | A | * | 9/2000 | Creger et al. ................... 172/7 |
| 6,317,676 | B1 | * | 11/2001 | Gengler et al. ............... 701/82 |
| 6,341,478 | B1 |   | 1/2002 | Sallstrom et al. |
| 6,484,481 | B1 |   | 11/2002 | Langworthy et al. |
| 2002/0074746 | A1 |   | 6/2002 | Eberling et al. |

* cited by examiner

*Primary Examiner*—Meredith C. Petravick
(74) *Attorney, Agent, or Firm*—Harness, Dickey & Pierce, P.L.C.

(57) ABSTRACT

A traction enhancement system and method of using the same for use with a turf mower having a vehicle frame, a first drive wheel operably mounted to the vehicle frame, and a cutting unit positionable in a first position, where the cutting unit is support by ground engaging rollers, and a second position, where the cutting unit is support by the vehicle frame. A traction system is then operably coupled between the cutting unit and the vehicle frame such that the traction system can modulate the cutting unit between the first position and the second position for improved traction of the first drive wheel.

33 Claims, 2 Drawing Sheets

US 7,051,498 B2

TRACTION ENHANCEMENT SYSTEM FOR TURF MOWERS

FIELD OF THE INVENTION

The present invention relates to turf mowers and, more particularly, relates to a traction enhancement system for turf mowers.

BACKGROUND OF THE INVENTION

As is well known in the art, turf mowers are often used for maintenance in varying topographical environments, such as field mowing, lawn mowing, golf course maintenance, and the like. These turf mowers are typically riding-type and include at least one mowing deck suspended for the vehicle frame. The mowing deck is movable between a raised non-cutting position, often used during vehicle travel from one cutting area to another to avoid hitting obstacles such as curbs and stones, and a lowered cutting position. Conventional mowing decks often employ decks wheels and/or rollers which serve to support the mowing deck on the ground in this lowered cutting position. Consequently, the weight of the mowing deck is carried by these deck wheels and/or rollers. This arrangement ensures that a constant and consistent cut height is maintain during the cutting operation.

Many riding turf mowers are equipped with mechanisms for positioning the mowing deck to a desired cutting height. Most of these mechanisms consist of linkages interconnecting the mowing deck and a lever, which is directly controlled by a hydraulic or electric actuation system. The actuation system is often controlled by the operator's hand or foot.

Operators of these turf mowers must often traverse slippery and/or inclined terrain during the cutting operation, when the mowing deck is in the lowered cutting position. Depending upon the slope of the grade or the condition of the turf, many known turf mowers exhibit loss of traction in the drive wheel in such situations, which complicate or even prevent cutting of some difficult areas.

Accordingly, there exists a need in the relevant art to provide a turf mower having improved traction performance. Furthermore, there exists a need in the relevant art to provide a traction enhancing system for a turf mower to improve operation thereof. Still further, there exists a need in the relevant art to provide a turf mower that is capable of overcoming the disadvantages of the prior art.

SUMMARY OF THE INVENTION

According to the principles of the present invention, a traction enhancement system is provided having an advantageous construction and method of use. The traction enhancement system is ideally for use with a turf mower having a vehicle frame, a first drive wheel operably mounted to the vehicle frame, and a cutting unit positionable in a first position, where the cutting unit is support by ground engaging rollers, and a second position, where the cutting unit is support by the vehicle frame. A traction system is then operably coupled between the cutting unit and the vehicle frame such that the traction system can modulate the cutting unit between the first position and the second position for improved traction of the first drive wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
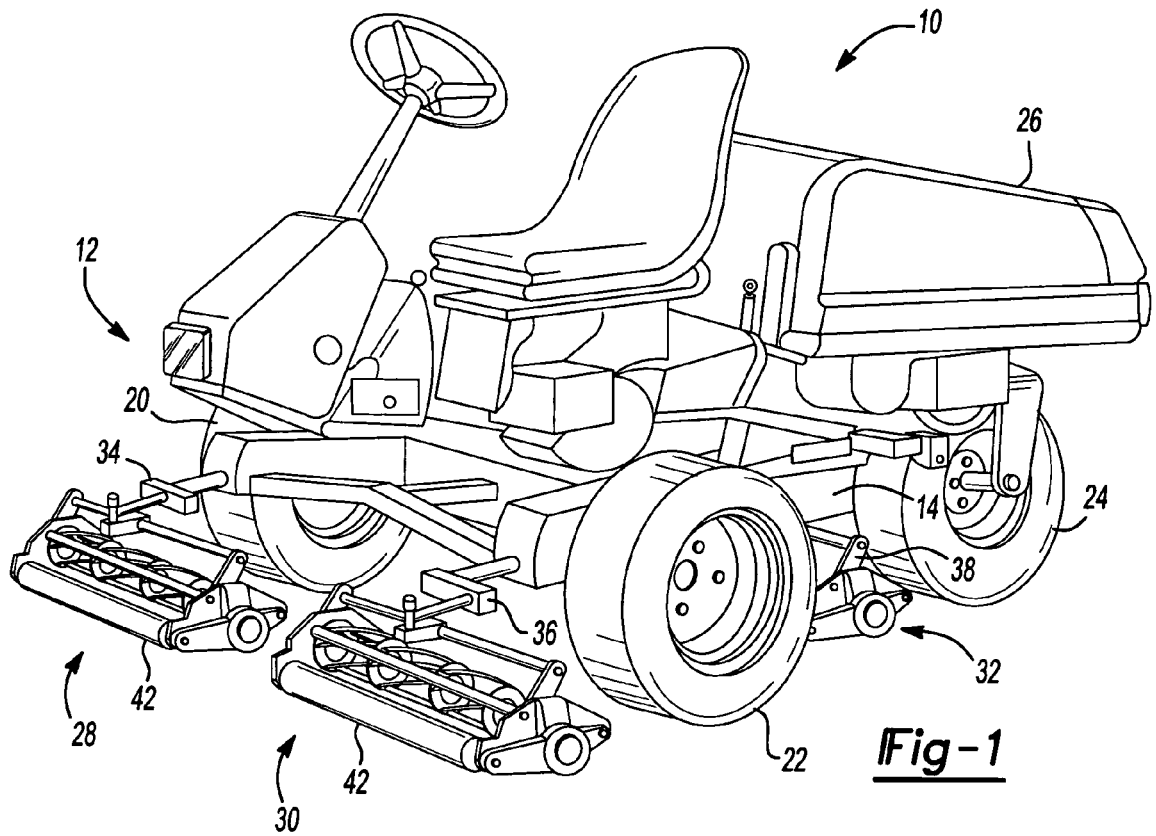
FIG. 1 is a perspective view of a first turf mower employing a traction enhancement system according to the principles of the present invention.

With reference now to the figures, FIG. 1 is a general illustration of a mower 10 incorporating a traction enhancement system 12 of the present invention. Although the invention is described with respect to the preferred embodiment, those skilled in the art will recognize that other versions of the mower 10 are possible and that the invention is not limited to any specific embodiment.

In the embodiment shown in FIG. 1, mower 10 generally includes three wheels 20, 22, and 24 operably mounted to a vehicle frame 14. Two front drive wheels 20 and 22 are powered by a drive motor 26. Rear wheel 24 is positioned behind and between front drive wheels 20 and 22 and is pivotable to steer mower 10. In the present embodiment, a plurality of mowing decks or cutting units 28, 30, and 32 are provided. It should be understood that the present invention is not limited to reel-type or rotary-type mowing decks. The present invention could be used with any one of a number of available cutting units while still remaining within the spirit and scope of the invention.

Figure 2:
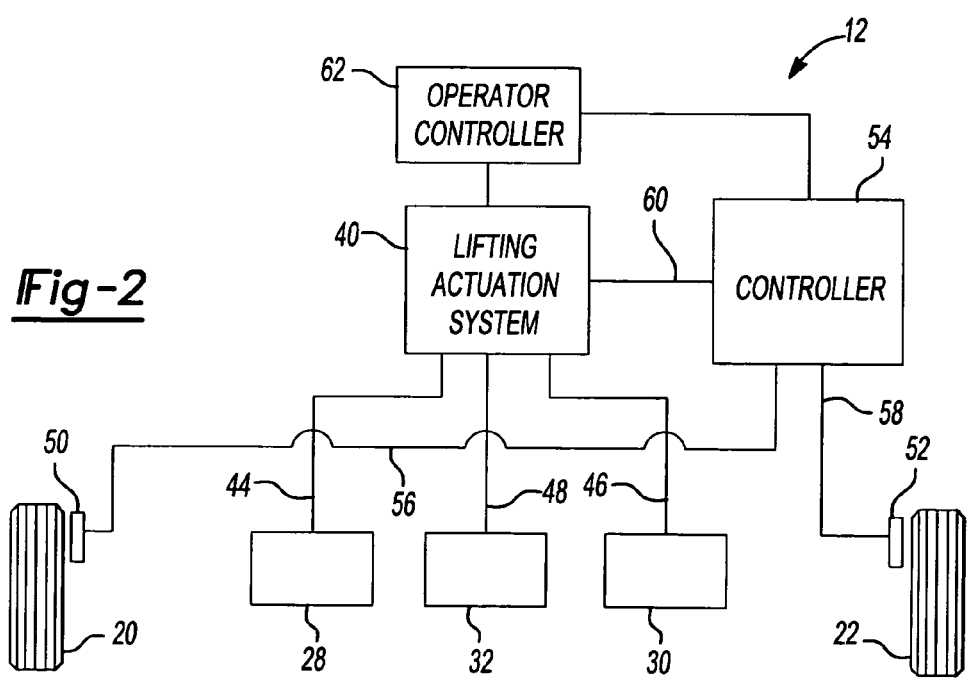
FIG. 2 is a schematic view of the traction enhancement system according to the principles of the present invention.

Still referring to FIG. 1, cutting units 28, 30, and 32 generally are positioned ahead of each wheel 20, 22, and 24, respectively. Of course other positions are possible. Cutting units 20, 22, and 24 are mounted on lift arms 34, 36, and 38, which are in turn operably coupled to a lifting actuation system 40 (FIG. 2). Lifting actuation system 40 may be either hydraulically or electrically operated. The operator selectively raises and lowers lift arms 34, 36, and 38 depending on which cutting unit the operator wishes to use or to service. Each cutting unit 20, 22, and 24 is preferably individually actuatable to provide varying cut heights.

Figure 4:
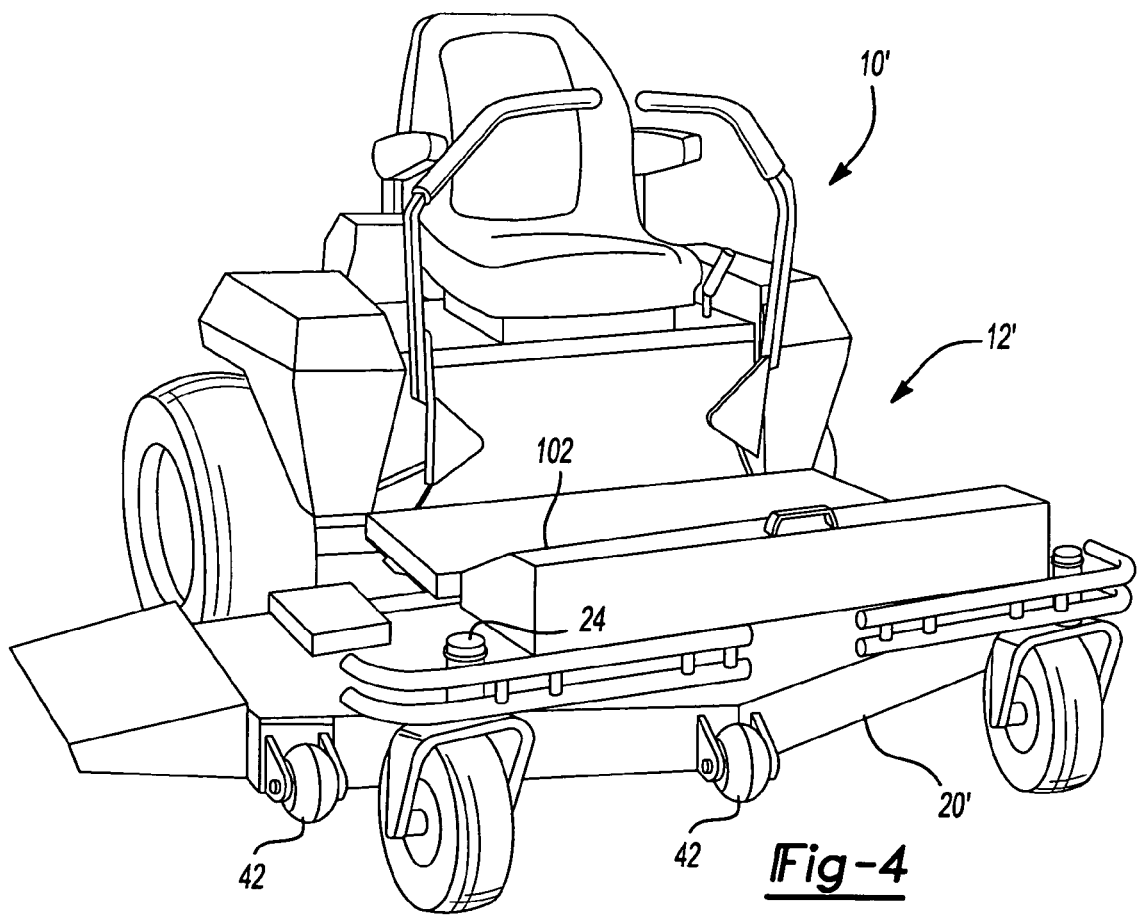
FIG. 4 is a perspective view of a second turf mower employing the traction enhancement system according to the principles of the present invention.

Cutting units 20, 22, and 24 each include a plurality of ground rollers 42, which are adapted to engage a ground surface. As seen in FIG. 4, ground rollers 42 may be wheels mounted upon cutting unit or mowing deck 20'. In operation, when cutting units 20, 22, and 24 are positioned in the lowered cutting position, the plurality of ground rollers 42 engage the ground surface and support a substantial portion of the weight of cutting units 20, 22, and 24.

As best seen in FIG. 2, traction enhancement system 12 is illustrated schematically to provide a general overview of its structure. However, it should be appreciated that traction enhancement system 12 may be varied to provide additional features or utilize different control and/or data acquisition techniques. With particular reference to FIG. 2, traction enhancement system 12 includes the aforementioned lifting actuation system 40, which is operably coupled to cutting units 28, 30, and 32 via control lines 44, 46, and 48 and lifting arms 34, 36, and 38, respectively. Lifting actuation system 40 is either hydraulically or electrically operated to produce a lifting force sufficient to raise each cutting unit 28, 30, and 32 from a lowered cutting position (shown in FIG. 1) to a raised transport (non-cutting) position. Preferably, lifting actuation system 40 is capable of positioning each cutting unit 28, 30, and 32 individually at any position between the lowered cutting position and the raised transport position to provide varying cutting heights.

Still referring to FIG. 2, traction enhancement system 12 further includes a pair of wheel sensors 50 and 52 operably coupled to drive wheels 20 and 22. The pair of wheel sensors 50 and 52 are operable to detect a spin rate of each drive wheel 20 and 22 and output a signal to a modulation controller 54 via lines 56 and 58, respectively. Modulation controller 54 in turn compares the signals of wheel sensors 50 and 52 to sense drive wheel slippage.

When drive wheel slippage is detected, modulation controller 54 outputs a modulating signal to lifting actuation system 40 via a line 60. The modulating signal preferably commands lifting actuation system 40 to raise at least one cutting unit 28, 30, and 32. Specifically, this raising of at least one cutting unit 28, 30, and 32 is preferably sufficient to transfer the weight of cutting unit 28, 30, and/or 32 to vehicle frame 14, but without raising cutting unit 28, 30, or 32 so much as to change the cutting height. In other words, the modulating signal preferably commands lifting actuation system 40 to transfer the weight of cutting unit 28, 30, and/or 32 to vehicle frame 14 so as to increase the overall weight of turf mower 10. Increasing the overall weight of turf mower 10 consequently increases the downward force and, thus, the traction force of drive wheels 20 and 22.

Most preferably, modulation controller 54 commands a periodic raising and lowering (or dithering) of cutting unit 28, 30, and/or 32 to further increase the downward force exerted on drive wheels 20 and 22 due to the acceleration of the mass of cutting unit 28, 30, and/or 32. That is, as one recalls, force equals mass times acceleration. Therefore, by accelerating the mass of cutting unit 28, 30, and/or 32, the resultant force is greater than if the cutting unit 28, 30, and/or 32 is merely supported above the ground surface. Ideally, modulation controller 54 would modulate cutting unit 28, 30, and/or 32 at a predetermined frequency to provide maximized downward force. This may be accomplished via a hydraulic proportional valve or electrical switching system. This modulation or dithering preferably continues for a predetermined amount of time or until slippage is no longer detected.

It has been found that this predetermined modulation frequency ideally varies with the mass of the cutting units. Therefore, cutting units having a larger mass may only require a lower modulation frequency, while cutting units having a lower mass may require a higher modulation frequency.

Figure 3:
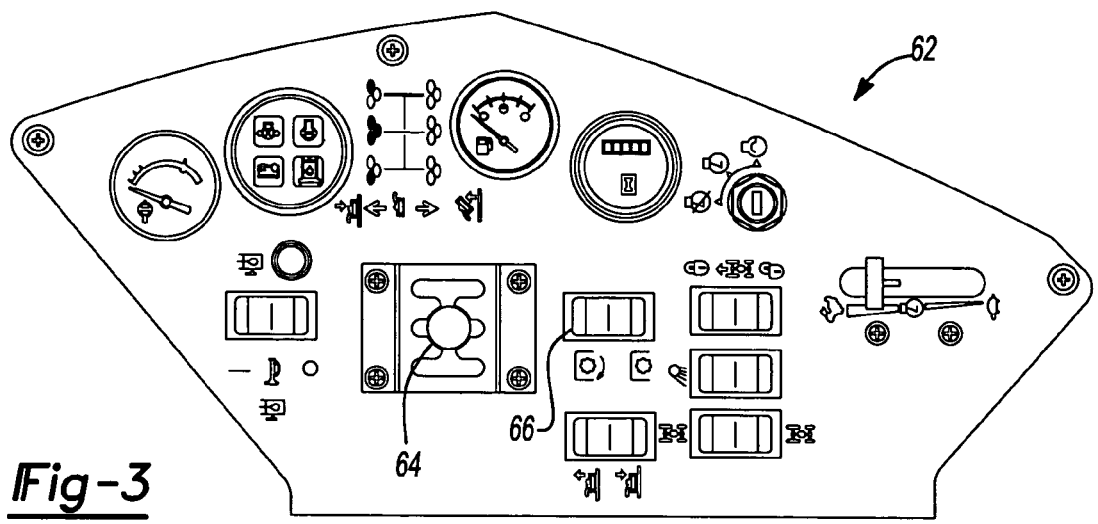
FIG. 3. is a schematic view of an operator control panel.

Referring now to FIGS. 2 and 3, modulation controller 54 and lifting actuation system 40 are each configurable via an operator control panel 62. Operator control panel 62 preferably includes a cutting unit lift lever 64 and a traction assist switch 66. Cutting unit lift lever 64 is preferably operable to raise and lower cutting units 28, 30, and 32 either collectively or individually. Traction assist switch 66 is preferably a three-position switch positionable between an 'auto' position, an 'on' position, and an 'off' position. In the 'auto' position, modulation controller 54 will continuously monitor wheel sensors 50 and 52 and upon detection of slippage will output a modulating command signal to improve traction of drive wheels 20 and 22. In the 'on' position, modulation controller 54 will immediately output a modulating command signal irrespective of wheel sensors 50 and 52. In this way, an operator can bypass wheel sensors 50 and 52 to achieve on-demand traction assist. Finally, in the 'off' position, traction enhancement system 12 is deactivated.

It should be appreciated that traction assist switch 66 may be a two-position switch positionable in any two of the three setting described above. Additionally, traction assist switch 66 may be such that it returns to a desired position either after actuation or upon ignition of turf mower 10.

As best seen in FIG. 4, traction enhancement system 12, indicate at 12', may be used with a wide variety of turf mowers, such as zero-turning radius riding mowers 10'. Additionally, it should be understood that the principles of the present invention are equally applicable to other applications, such as the modulation of snow plow blades on vehicles.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A traction enhancement system for use with a turf mower, said system comprising:
   a vehicle frame;
   a first drive wheel operably mounted to said vehicle frame;
   a cutting unit positionable in a first position and a second position and having a mass;
   a traction system operably coupled between said cutting unit and said vehicle frame, said traction system operable to modulate said cutting unit between said first position and said second position for improved traction of said first drive wheel, said traction system including:
      a lifting actuation system operably coupled to said cutting unit, said lifting actuation system operable to move said cutting unit between said first position and said second position at a predetermined frequency; and
      a modulation controller operable to detect slippage of said first drive wheel, said modulation controller outputting a command signal to said lifting actuation system to move said cutting unit between said first position and said second position at the predetermined frequency.

2. The traction enhancement system according to claim 1 wherein said traction system comprises:
   at least one sensor operably coupled to said first drive wheel, said at least one sensor outputting a signal in response to a rotational speed of said first drive wheel, said signal being operably received by said modulation controller for detection of first drive wheel slippage;
   wherein a downward force of said cutting unit determined by multiplying an acceleration of said cutting unit by said mass is maximized at said predetermined frequency.

3. The traction enhancement system according to claim 2 wherein said lifting actuation system is a hydraulic system.

4. The traction enhancement system according to claim 2 wherein said lifting actuation system is an electrical system.

5. The traction enhancement system according to claim 2 wherein said modulation controller is manually actuatable by an operator.

6. The traction enhancement system according to claim 2 wherein said modulation controller outputs said command signal for a predetermined amount of time.

7. The traction enhancement system according to claim 2 wherein said modulation controller outputs said command signal until said slippage is no longer detected.

8. The traction enhancement system according to claim 1 wherein said cutting unit includes ground engaging rollers, said cutting unit being carried by said ground engaging rollers when said cutting unit is in said first position and carried by said vehicle frame when said cutting unit is in said second position.

9. The traction enhancement system according to claim 1, further comprising:
at least one sensor operably coupled to said first drive wheel, said at least one sensor outputting a signal in response to a rotational speed of said first drive wheel,
wherein said traction system modulates said cutting unit between said first position and said second position in response to said signal.

10. The traction enhancement system according to claim 1 wherein said traction system modulates said cutting unit between said first position and said second position in response to an operator signal.

11. The traction enhancement system according to claim 1, further comprising:
a second drive wheel operably mounted to said vehicle frame;
a pair of sensors operably coupled to each of said first drive wheel and said second drive wheel, said pair of sensors each outputting a signal in response to a rotational speed of said respective drive wheel,
wherein said traction system modulates said cutting unit between said first position and said second position in response to said signals.

12. A traction enhancement system for use with a turf mower, said system comprising:
a vehicle frame;
first drive wheel operably mounted to said vehicle frame;
at least one sensor operably coupled to said first drive wheel, said at least one sensor outputting a signal in response to a rotational speed of said first drive wheel;
a cutting unit positionable in a first position and a second position; and
a traction system operably connected between said cutting unit and said vehicle frame, said traction system operable to modulate said cutting unit between said first position and said second position at a predetermined frequency in response to said signal for improved traction of said first drive wheel, said traction system including:
a modulation controller operable to detect slippage of said first drive wheel, said modulation controller outputting a command signal to said traction system to move said cutting unit between said first position and said second position at the predetermined frequency.

13. The traction enhancement system according to claim 12 wherein said traction system comprises:

a lifting actuation system operably coupled to said cutting unit, said lifting actuation system operable to move said cutting unit between said first position and said second position.

14. The traction enhancement system according to claim 13 wherein said lifting actuation system is a hydraulic system.

15. The traction enhancement system according to claim 13 wherein said lifting actuation system is an electrical system.

16. The traction enhancement system according to claim 13 wherein said modulation controller is manually actuatable by an operator.

17. The traction enhancement system according to claim 13 wherein said modulation controller outputs said command signal for a predetermined amount of time.

18. The traction enhancement system according to claim 12 wherein said modulation controller outputs said command signal until said slippage is no longer detected.

19. The traction enhancement system according to claim 12 wherein said cutting unit includes ground engaging rollers, a weight of said cutting unit being carried by said ground engaging rollers when said cutting unit is in said first position and carried by said vehicle frame when said cutting unit is in said second position.

20. The traction enhancement system according to claim 12 wherein said traction system modulates said cutting unit between said first position and said second position in response to an operator signal.

21. The traction enhancement system according to claim 12, further comprising:
a second drive wheel operably mounted to said vehicle frame;
a pair of sensors operably coupled to each of said first drive wheel and said second drive wheel, said pair of sensors each outputting a signal in response to a rotational speed of said respective drive wheel,
wherein said traction system modulates said cutting unit between said first position and said second position in response to said signals.

22. A traction enhancement system for use with a turf mower, said system comprising:
a vehicle frame;
a first drive wheel operably mounted to said vehicle frame;
a cutting unit having ground engaging rollers, said cutting unit operable for cutting turf;
a traction system operably coupled between said cutting unit and said vehicle frame, said traction system operable to modulate said cutting unit between a first position where a weight of said cutting unit is substantially carried by said ground engaging rollers while cutting and a second position where said weight of said cutting unit is substantially carried by said vehicle frame while cutting for improved traction of said first drive wheel; and
a predetermined frequency used for said modulation of said cutting unit.

23. The traction enhancement system according to claim 22 wherein said traction system comprises:
at least one sensor operably coupled to said first drive wheel, said at least one sensor outputting a signal in response to a rotational speed of said first drive wheel;
a lifting actuation system operably coupled to said cutting unit, said lifting actuation system operable to move said cutting unit between said first position and said second position; and a modulation controller operable to receive said signal and detect slippage of said first drive wheel, said modulation controller outputting a command signal to said lifting actuation system to move said cutting unit between said first position and said second position upon detection of said slippage.

24. The traction enhancement system according to claim 23 wherein said lifting actuation system is a hydraulic system.

25. The traction enhancement system according to claim 23 wherein said lifting actuation system is an electrical system.

26. The traction enhancement system according to claim 23 wherein said modulation controller is manually actuatable by an operator.

27. The traction enhancement system according to claim 23 wherein said modulation controller outputs said command signal for a predetermined amount of time.

28. The traction enhancement system according to claim 23 wherein said modulation controller outputs said command signal until said slippage is no longer detected.

29. The traction enhancement system according to claim 22 wherein said traction system modulates said cutting unit between said first position and said second position in response to an operator signal.

30. The traction enhancement system according to claim 22, further comprising:
  a second drive wheel operably mounted to said vehicle frame;
  a pair of sensors operably coupled to each of said first drive wheel and said second drive wheel, said pair of sensors each outputting a signal in response to a rotational speed of said respective drive wheel,
  wherein said traction system modulates said cutting unit between said first position and said second position in response to said signals.

31. A method of enhancing traction of a turf mower, said turf mower having a vehicle frame, a first drive wheel operably mounted to said vehicle frame, a cutting unit having ground engaging rollers, and a traction system operably coupled between said cutting unit and said vehicle frame, said method comprising:
  modulating said cutting unit between a first position where a weight of said cutting unit is substantially carried by said ground engaging rollers and a second position where said weight of said cutting unit is substantially carried by said vehicle frame upon detection of slippage of said drive wheel; and
  maximizing a downward force of said cutting unit by operably multiplying an acceleration of said cutting unit by said weight at a predetermined frequency.

32. The method according to claim 31 wherein said turf mower further includes a second drive wheel and a pair of sensors operably coupled to each of said first drive wheel and said second drive wheel to detect a rotational speed thereof and output a signal, said step of modulating said cutting unit further comprises:
  comparing said signals from the pair of sensors to automatically determine wheel slippage; and
  modulating said cutting unit at said predetermined frequency between said first position and said second position in response to said signals.

33. The method according to claim 31 wherein said turf mower further includes an operator actuatable switch selectively outputting an operator signal, said step of modulating said cutting unit further comprises:
  modulating said cutting unit between said first position and said second position in response to said operator signal.

* * * * *